US012661969B2

(12) United States Patent
Hong et al.

(10) Patent No.: US 12,661,969 B2
(45) Date of Patent: Jun. 23, 2026

(54) STORAGE SYSTEM FOR STORING HIGH-VOLTAGE BATTERY PACKS IN VEHICLE

(71) Applicants:Hyundai Motor Company, Seoul (KR); Kia Corporation, Seoul (KR)

(72) Inventors: Suk Won Hong, Bucheon (KR); Hyeong Jong Kim, Seoul (KR); Ju Yeol Kong, Ansan (KR); Byeong Kwang Kim, Suwon (KR); So Young Yoo, Suwon (KR); Han Su Yoo, Hwaseong (KR); Byung Yong Choi, Hwaseong (KR); Sang Do Park, Seoul (KR); Seong Hyeon Shin, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 18/528,852

(22) Filed: Dec. 5, 2023

(65) Prior Publication Data

US 2025/0042234 A1 Feb. 6, 2025

(30) Foreign Application Priority Data

Aug. 3, 2023 (KR) ........................ 10-2023-0101608

(51) Int. Cl.
| | |
|---|---|
| *B60K 1/04* | (2019.01) |
| *B60L 50/60* | (2019.01) |
| *B60L 50/64* | (2019.01) |
| *B60N 2/24* | (2006.01) |
| *H01M 50/204* | (2021.01) |
| *H01M 50/244* | (2021.01) |

(Continued)

(52) U.S. Cl.
CPC ................ *B60K 1/04* (2013.01); *B60L 50/64* (2019.02); *B60L 50/66* (2019.02); *B60N 2/24* (2013.01); *H01M 50/204* (2021.01); *H01M 50/244* (2021.01); *H01M 50/249* (2021.01); *H01M 50/258* (2021.01); *B60K 2001/0405* (2013.01); *B60K 2001/0483* (2013.01); *H01M 2220/20* (2013.01)

(58) Field of Classification Search
CPC ............. B60K 1/04; B60R 2011/0066; H01M 50/204; B60L 50/66; B60L 50/64
See application file for complete search history.

(56) References Cited

U.S. PATENT DOCUMENTS 8,167,367 B1 * 5/2012 Martinez .................. A47C 7/38
297/180.12

FOREIGN PATENT DOCUMENTS

JP 2014008846 A * 1/2014
KR 10-2013-0032959 A 4/2013

* cited by examiner

*Primary Examiner* — Marc Q Jimenez
*Assistant Examiner* — James J Triggs
(74) *Attorney, Agent, or Firm* — Fox Rothschild LLP

(57) ABSTRACT

A storage system for a vehicle has a configuration capable of storing a plurality of high-voltage battery packs in a separably assembled state in a seat backboard of the vehicle through a coupling structure of a protrusion and a groove. Only a broken or failed high-voltage battery pack from among a plurality of high-voltage battery packs assembled to the seat backboard is separated from the seat backboard, and a new high-voltage battery pack can then replace the failed high-voltage battery pack through assembly thereof to the seat backboard at a position from which the failed high-voltage battery pack has been separated.

17 Claims, 8 Drawing Sheets

(51) Int. Cl.
  H01M 50/249 (2021.01)
  H01M 50/258 (2021.01)

STORAGE SYSTEM FOR STORING HIGH-VOLTAGE BATTERY PACKS IN VEHICLE

CROSS-REFERENCE TO RELATED APPLICATION

This application claims under 35 U.S.C. § 119(a) the benefit of Korean Patent Application No. 10-2023-0101608 filed on Aug. 3, 2023 in the Korean Intellectual Property Office, the entire contents of which are incorporated herein by reference.

BACKGROUND

1. Technical Field

The present disclosure relates to a storage system for a vehicle, more particularly, to the storage system configured to store a plurality of high-voltage battery packs in a separably assembled state in a vehicle seat.

2. Description of the Related Art

Certain eco-friendly vehicles, including hybrid electric vehicles, fuel cell vehicles, and electric vehicles, are each configured to be driven using an electric motor. In such a vehicle, a high-voltage battery pack, which is configured to provide driving electric power to the electric motor, must be mounted in the vehicle. The high-voltage battery pack is configured to supply required electric power while repeating recharging and discharging operations during driving of the vehicle.

The high-voltage battery pack as mentioned above typically includes a battery case, a plurality of battery modules mounted in the battery case, and a battery management system (BMS) configured to sense a voltage, a current, and a temperature of each of unit cells included in the battery modules and to control operation of each of the unit cells based on sensed results.

Conventionally, a high-voltage battery pack is stored only in a main space of one of a lower portion of a vehicle body, a roof-side space, or a trunk space, and thus it is difficult to secure an additional storage space for a high-voltage battery pack. Due to limited storage space for the high-voltage battery pack, there is a drawback in that a maximum driving range of the vehicle is short.

In addition, when one or more of the battery modules breaks or fails, the entire high-voltage battery pack module should be replaced, which may result in increased costs. The above matters disclosed in this section are merely for enhancement of understanding of the general background of the disclosure and should not be taken as an acknowledgement or any form of suggestion that the matters form the related art already known to a person skilled in the art.

SUMMARY

It is an object of the present disclosure to store an increased number of high-voltage battery packs in a vehicle through a storage system capable of storing a plurality of high-voltage battery packs in a separably assembled state in a vehicle seat while additionally securing a space of a seat backboard, in order to achieve an increase in a maximum driving range of the vehicle.

It is another object of the present disclosure to achieve swapping of a high-voltage battery pack irrespective of a shape and a size of a seat backboard through a configuration in which a plurality of high-voltage battery packs is separably assembled in the seat backboard and, as such, to achieve a reduction in costs.

It is another object of the present disclosure to achieve a reduction in costs associated with replacement and repair through a configuration capable of separating only broken or failed ones from a plurality of high-voltage battery packs assembled in a seat backboard, for replacement thereof.

It is another object of the present disclosure to contribute to eco-friendly management by promoting battery recycling.

It is another object of the present disclosure to achieve additional increases in strength and stiffness of a seat by assembling a plurality of high-voltage battery packs in a seat backboard.

Objects of the present disclosure are not limited to the above-described objects, and other objects of the present disclosure not yet described will be more clearly understood by those skilled in the art from the following detailed description.

In accordance with an aspect of the present disclosure, the above and other objects can be accomplished by the provision of a storage system for a vehicle including a storage device provided in a vehicle seat, and a battery pack assembled in the storage device in a separable state. For example, the battery pack may be a high-voltage battery pack.

The storage device may include a seat backboard provided in the vehicle seat. The seat backboard and the high-voltage battery pack may be assembled in a separable state through a first coupler.

The first coupler may include a protrusion provided in one surface of the seat backboard, to protrude from the surface of the seat backboard, and a groove provided in one surface of the high-voltage battery pack and configured to receive the protrusion, for assembly therebetween.

When viewed in an upright state of the seat backboard, the protrusion may be formed in a front surface of the seat backboard, and a back surface of the seat backboard takes a form of a flat surface.

The protrusion may include plural protrusions, and the battery pack may include plural high-voltage battery packs.

The plural protrusions may form a particular pattern at the one surface of the seat backboard. The plural high-voltage battery packs may be assembled to the seat backboard.

Only a failed one of the plural high-voltage battery packs may be separated from the seat backboard, for replacement thereof.

The protrusion may include plural protrusions forming a particular pattern at the one surface of the seat backboard, and the groove may include at least two grooves formed at each of the high-voltage battery packs. The high-voltage battery packs may be assembled to the seat backboard through coupling of the at least two grooves to at least two of the plural protrusions.

The seat backboard provided with the protrusion may be formed of a plastic composite material, e.g., in order to secure strength.

The first coupler may include a plurality of fastening members threadedly fastened to the seat backboard while extending through the high-voltage battery pack.

The high-voltage battery pack may include plural high-voltage battery packs assembled to the seat backboard, and adjacent ones of the high-voltage battery packs assembled to the seat backboard may be assembled to each other in a separable state through a second coupler.

The second coupler may be one of an assembly structure of a protrusion and a groove, an assembly structure of a hook and a hook groove, or an assembly structure of a bolt or a screw, e.g., to assemble the adjacent high-voltage battery packs to each other in a separable state.

A vehicle may include the above-described storage system.

A storage system for a vehicle may include: a storage device comprising a seat backboard provided in a vehicle seat; a battery pack assembled in the storage device in a separable state; and a first coupler configured to assemble the seat backboard and the battery pack in a separable state.

The storage system may include plural protrusions; and the battery pack may include plural high-voltage battery packs.

The plural protrusions may form a particular pattern at the one surface of the seat backboard; and the plural high-voltage battery packs may be assembled to the seat backboard.

A failed one of the plural high-voltage battery packs may be configured to be separated from the seat backboard.

Only the failed one of the plural high-voltage battery packs may be configured to be replaced.

A vehicle may include the above-described storage system.

The storage system for the vehicle according to the present disclosure has a configuration capable of storing a plurality of high-voltage battery packs in a separably assembled state in the seat backboard of the vehicle seat. A space of the seat backboard may be additionally secured to store an increased number of high-voltage battery packs in the vehicle. Accordingly, there is an effect in that an increase in a maximum driving range of the vehicle may be achieved.

In addition, the storage system according to the present disclosure has a configuration in which a plurality of high-voltage battery packs is separably assembled in the seat backboard. Accordingly, it may be possible to achieve swapping of a high-voltage battery pack irrespective of the shape and size of the seat backboard. As a result, development investment of the storage system associated with different kinds of vehicles may be minimized and, as such, there is an effect in that a reduction in costs may be achieved.

Furthermore, the storage system according to the present disclosure has a configuration in which only a broken or failed high-voltage battery pack from among a plurality of high-voltage battery packs assembled to the seat backboard is separated from the seat backboard, and a new high-voltage battery pack is then replaced through assembly thereof to the seat backboard at a position from which the failed high-voltage battery pack has been separated. In accordance with this configuration, there is an effect in that costs associated with replacement or repair may be reduced.

In addition, the storage system according to the present disclosure has an effect in that the storage system may contribute to eco-friendly management through an increase in possibility of battery recycling.

Furthermore, the storage system according to the present disclosure has an effect in that it may be possible to achieve additional increases in strength and stiffness of the seat by the plurality of high-voltage battery packs assembled in the seat backboard.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
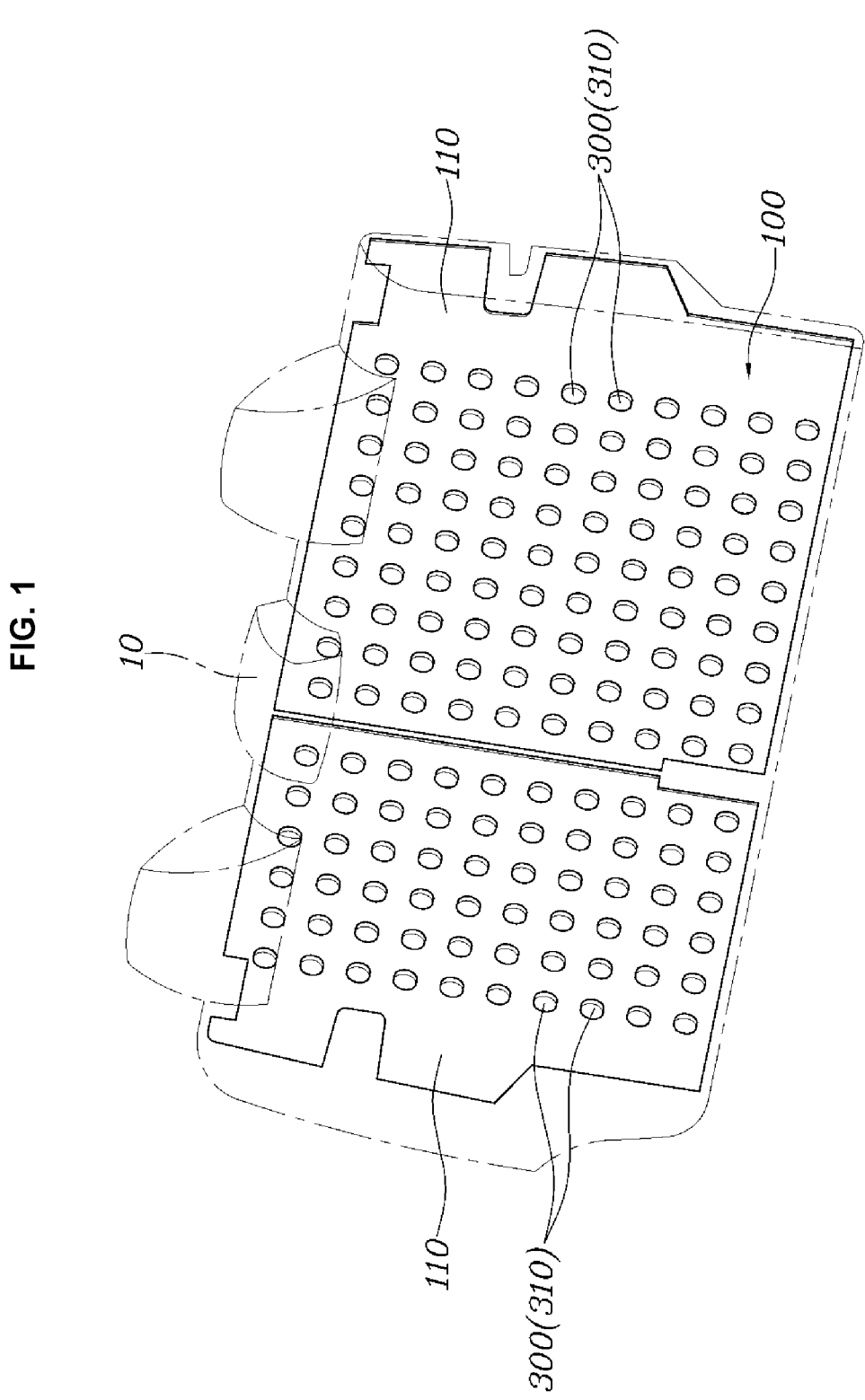
FIG. 1 is a view showing protrusions formed in a seat backboard of a vehicle in accordance with an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMS, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments of the present disclosure will be described in detail with reference to the accompanying drawings, and the same or similar elements are designated by the same reference numerals regardless of the numerals in the drawings and redundant description thereof will be omitted.

In describing the present disclosure, moreover, a detailed description will be omitted when a specific description of publicly known technologies to which the disclosure pertains is judged to obscure the gist of the present disclosure.

In addition, it should be noted that the accompanying drawings are merely illustrated to easily explain the spirit of the disclosure, and therefore, should not be construed as limiting the spirit of the disclosure to the accompanying drawings. On the contrary, the disclosure is to cover all modifications, equivalents, and alternatives falling within the spirit and scope of the disclosure as defined by the claims.

Although terms including an ordinal number, such as first or second, may be used to describe a variety of constituent elements, the constituent elements are not limited to the terms, and the terms are used only for the purpose of discriminating one constituent element from other constituent elements.

It will be understood that, when one element is referred to as being "connected to" or "coupled to" another element, one element may be "connected to" or "coupled to" another element via a further element although one element may be directly connected to or directly coupled to another element.

On the other hand, it will be understood that, when an element is referred to as being "directly connected to" or "directly coupled to" another element, there is no intervening element present.

Unless clearly used otherwise, singular expressions include a plural meaning.

In addition, the term "unit" or "control unit" used in specific terminology such as a motor control unit (MCU) or the like is only a term widely used for designation of a controller for controlling a particular function of a vehicle and, as such, does not mean a generic functional unit.

The controller may include a communication device configured to communicate with another controller or a sensor for control of a function to be performed thereby, a memory configured to store an operating system, logic commands, input/output information, etc., and at least one processor configured to execute discrimination, calculation, determination, etc. required for control of the function to be performed.

Hereinafter, a storage system for a vehicle according to an exemplary embodiment of the present disclosure will be described with reference to the accompanying drawings.

The storage system according to the exemplary embodiment of the present disclosure has a configuration capable of storing a plurality of high-voltage battery packs in a separably assembled state in a vehicle seat.

That is, as shown in FIGS. 1 to 8, the storage system according to the exemplary embodiment of the present disclosure includes a storage device 100 provided in a vehicle seat 10, and a high-voltage battery pack 200 assembled in the storage device 100 in a separable state.

The vehicle seat 10 provided with the storage device 100 is preferably a seatback of a rear seat without being limited thereto.

The storage device 100 includes a seat backboard 110 provided in the vehicle seat 10.

The high-voltage battery pack 200 is typically configured through inclusion of a battery case, a plurality of battery modules mounted in the battery case, and a battery management system (BMS) configured to sense a voltage, a current, and a temperature of each of unit cells constituting each of the battery modules and to control operation of the unit cell based on sensed results.

In accordance with the exemplary embodiment of the present disclosure, the seat backboard 100 and the high-voltage battery pack 200 are assembled in a separable state through a first coupler 300.

In conventional cases, a high-voltage battery pack is stored only in a main space of one of a lower portion of a vehicle body, a roof-side space, and a trunk space. However, the exemplary embodiment of the present disclosure provides a configuration in which a space of the seat backboard 100 is additionally secured to store a plurality of high-voltage battery packs 200 in the seat backboard 100 in a separably assembled state. In accordance with this configuration, there is an advantage in that an increase in a maximum driving range of the vehicle may be achieved.

The first coupler 300 includes a protrusion 310 provided in one surface of the seat backboard 110, to protrude from the surface of the seat backboard 110, and a groove 320 provided in one surface of the high-voltage battery pack 200 and configured to receive the protrusion 310, for assembly therebetween.

The protrusion 310 may take the form of a lug, such as a boss or a hook, protruding from one surface of the seat backboard 100. The groove 320 may be formed in one surface of the high-voltage battery pack 200, to have a shape corresponding to the protrusion 310 such that the protrusion 310 may be fitted in the groove 320, for assembly therebetween.

Figure 2:
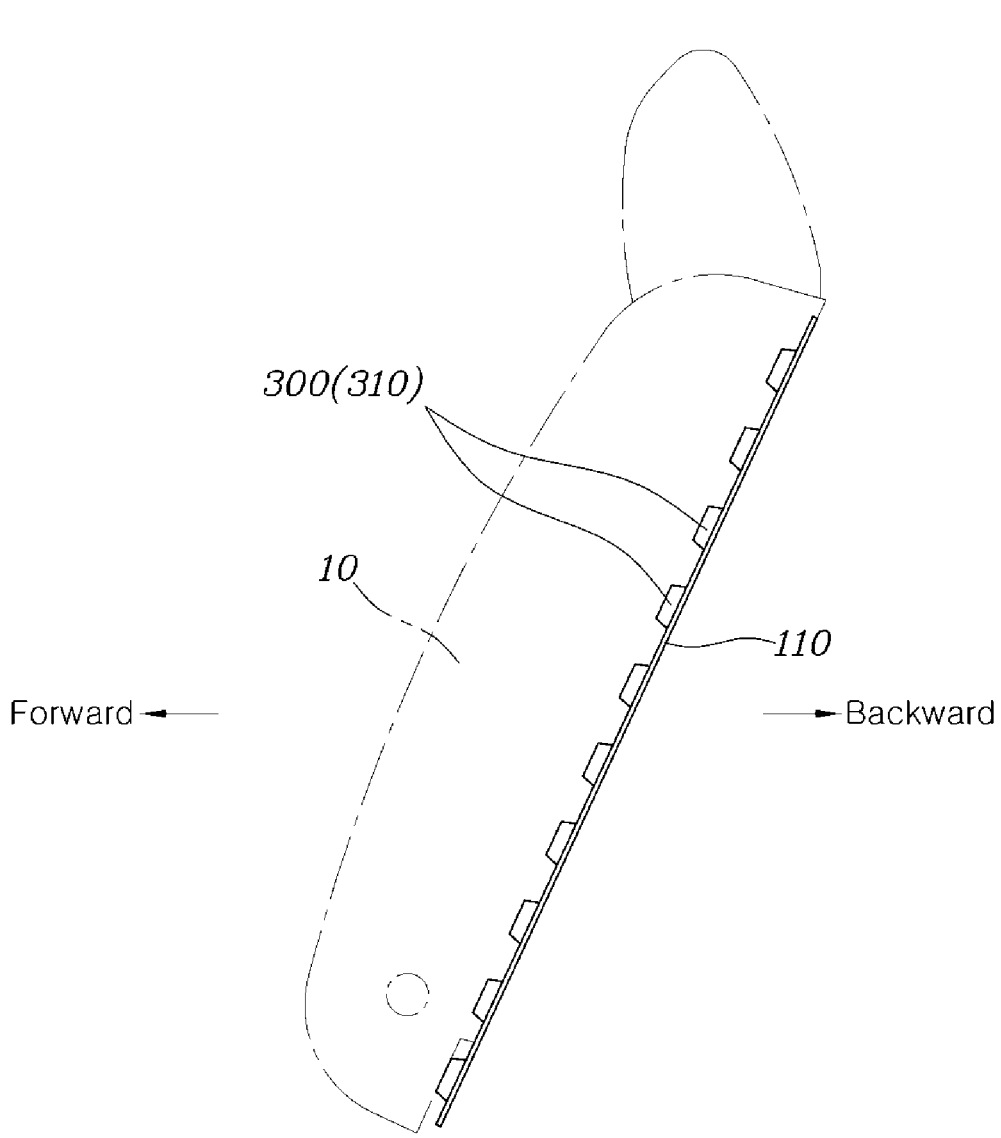
FIG. 2 is a side view corresponding to FIG. 1.

As shown in FIG. 2, when viewed in an upright state of the seat backboard 110, the protrusion 310 may be formed in a front surface of the seat backboard 110, and the back surface of the seat backboard 110 may take the form of a flat surface.

When the protrusion 310 is formed in the front surface of the seat backboard 110, the groove 320 is formed in a back surface of the high-voltage battery pack 200.

When the back surface of the seat backboard 110 takes the form of a flat surface, the flat back surface of the seat backboard 110 may be used to enable an article or a load to be laid thereon in a state in which the seat 200 is folded through forward rotation thereof.

Figure 3:
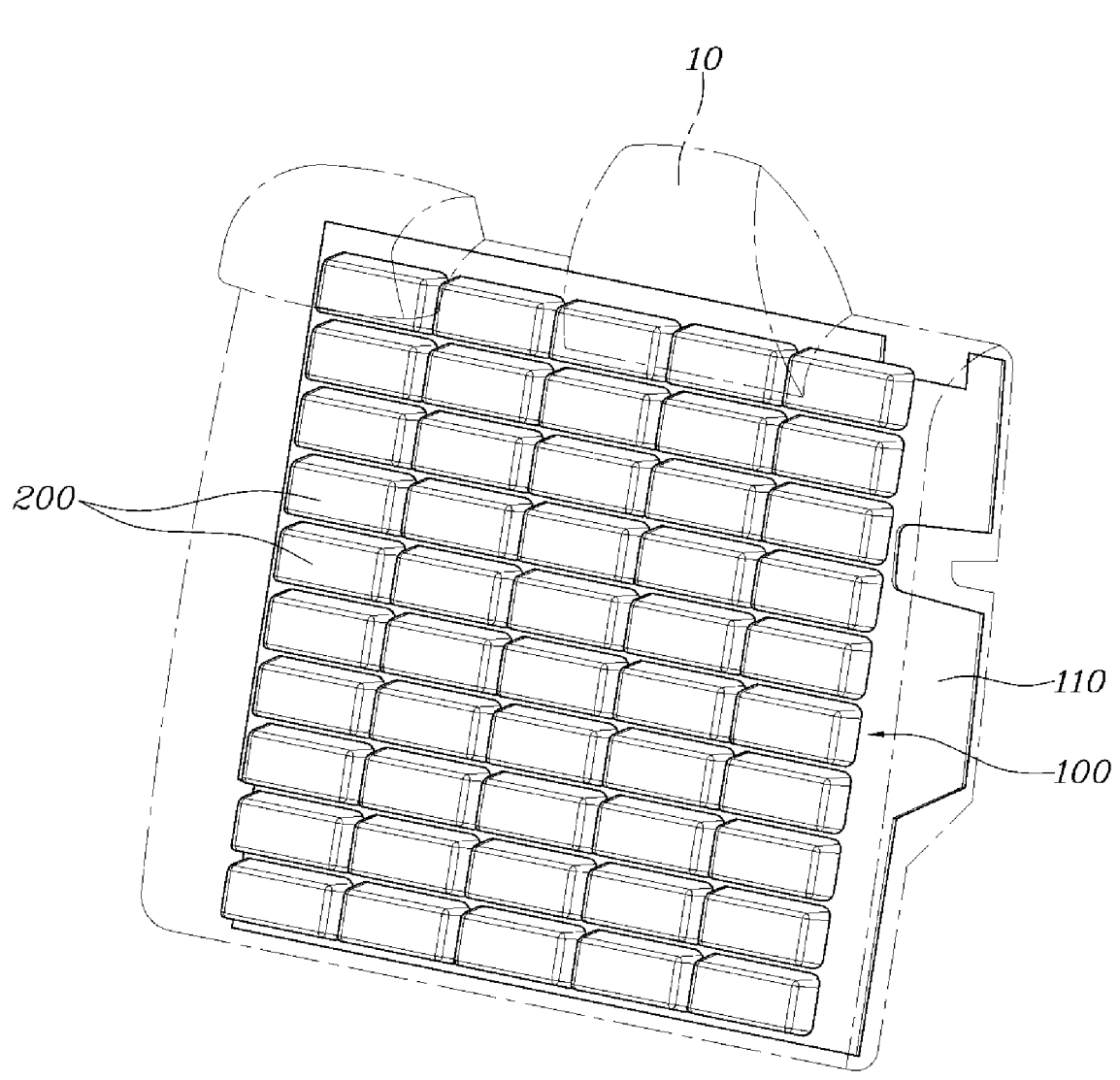
FIG. 3 is a view showing high-voltage battery packs assembled to a front surface of the seat backboard in accordance with the exemplary embodiment of the present disclosure.
Figure 4:
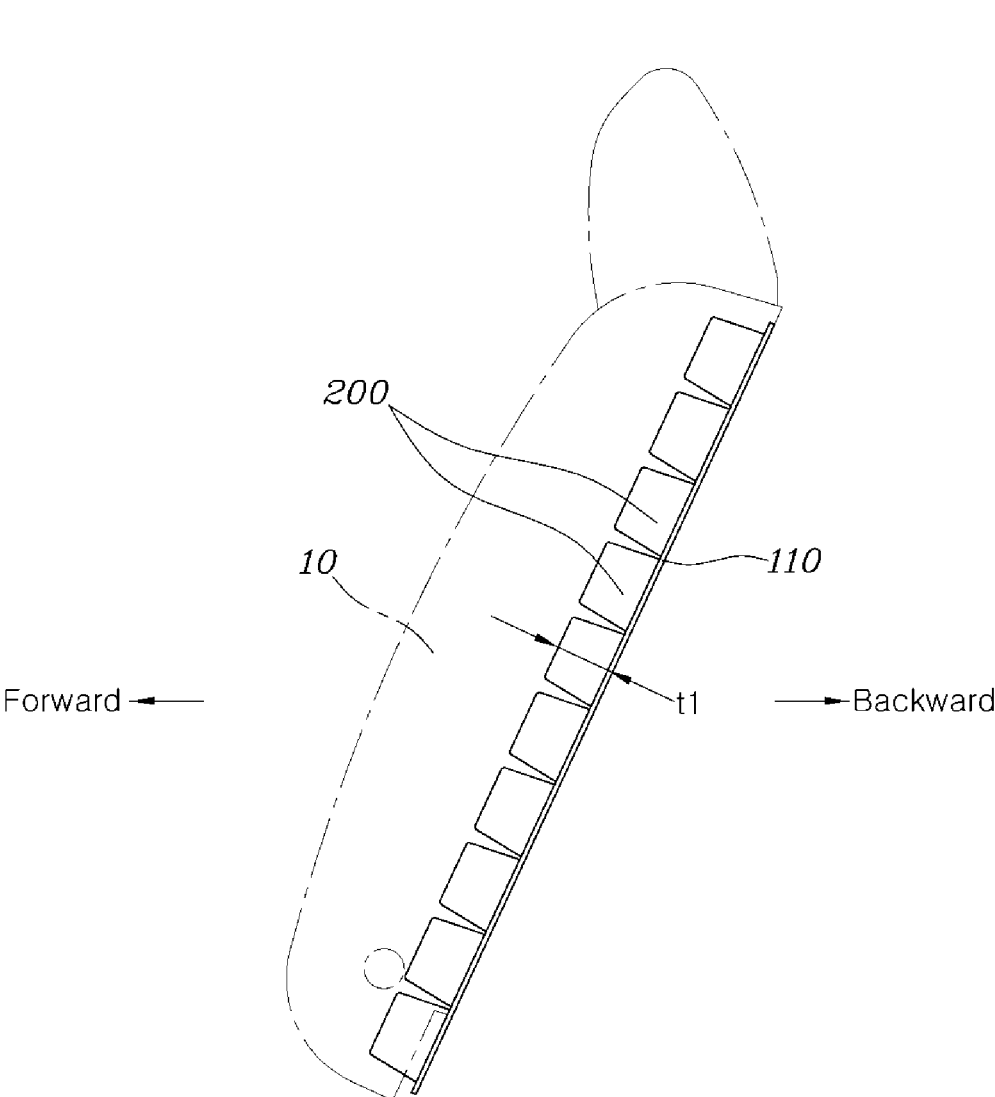
FIG. 4 is a side view corresponding to FIG. 3.
Figure 5:
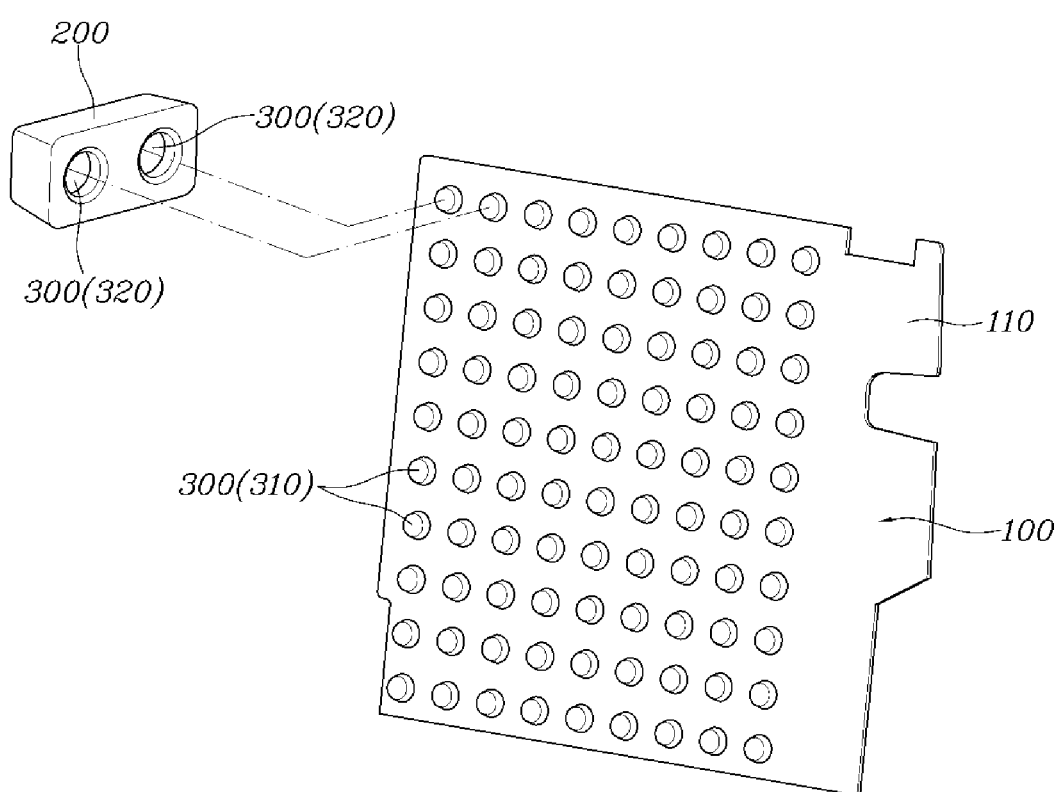
FIG. 5 is a view showing a state in which a high-voltage battery pack is separated from the seat backboard in accordance with the exemplary embodiment of the present disclosure.
Figure 6:
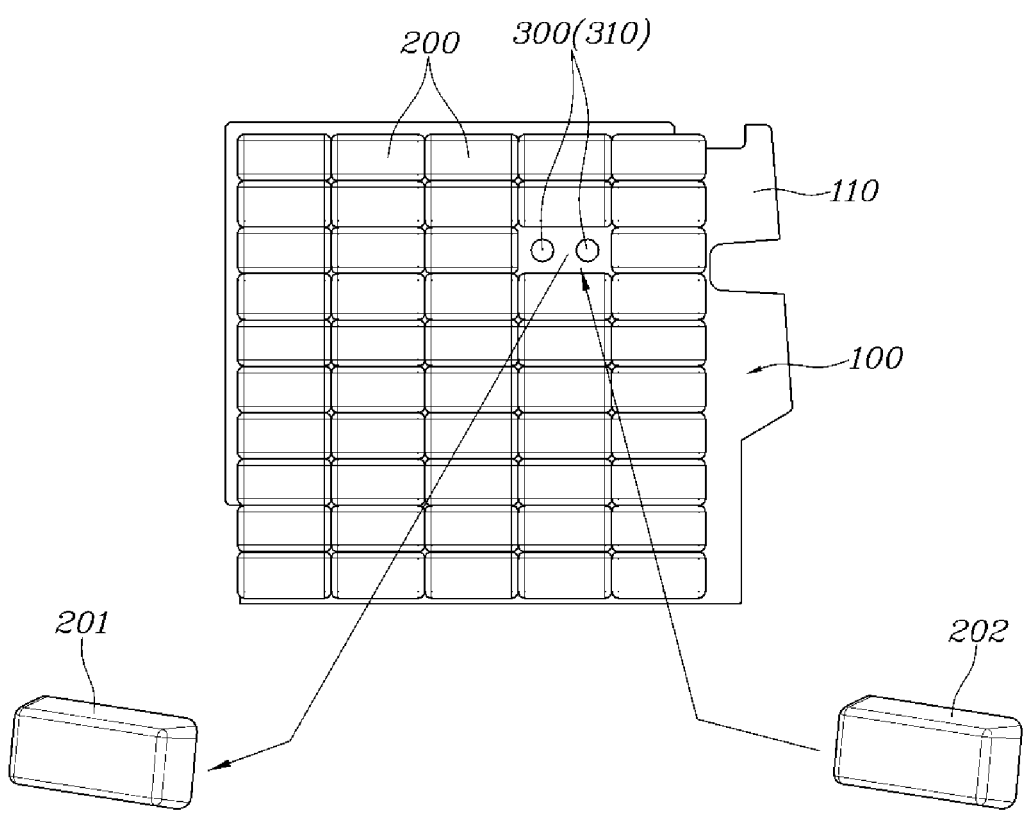
FIG. 6 is a view explaining a procedure of separating a high-voltage battery pack from the seat backboard, for replacement thereof, in accordance with the exemplary embodiment of the present disclosure.

When a plurality of high-voltage battery packs 200 is assembled to the front surface of the seat backboard 110 when viewed in an upright state of the seat backboard 110, as shown in FIGS. 3 and 4, the high-voltage battery packs 200, which are excellent in terms of strength and rigidity, may function as a structure capable of firmly supporting the entire surface of the seat backboard 110.

The above-described structure has advantages of a reduction in the number of constituent elements and a reduction in weight because a seatback pipe is not used, as compared to a conventional structure provided with a seatback pipe. In addition, there is an advantage in that sufficient strength is provided because a thickness t1 equivalent to that of the conventional structure provided with the seatback pipe is secured.

The protrusion 310 may be provided in plural such that plural protrusions 310 may form a particular pattern at one surface of the seat backboard 110. In this case, the high-voltage battery pack 200 may be provided in plural such that plural high-voltage battery packs 200 may be assembled to the seat backboard 310 in a separable state.

The protrusion 310 may be provided in plural such that plural protrusions 310 may form a particular pattern at the front surface of the seat backboard 110 in conformity with a shape of the seat backboard 110.

Although the plural protrusions 310 are shown as forming a lattice-shaped pattern at the front surface of the seat backboard 110 in accordance with the exemplary embodiment of the present disclosure, the plural protrusions 310 may form a pattern having various shapes, taking into consideration the outer shape of the seat backboard 110.

Although the seat backboard 110 may have various sizes and shapes in accordance with kinds of vehicles, the high-voltage battery pack 200 assembled to the seat backboard 110 in a separable state may be standardized in accordance with a design plan in which the size, shape, etc. of the high-voltage battery pack 200 is determined. In this regard, the high-voltage battery pack 200 has an advantage in that swapping thereof is possible irrespective of the shape and size of the seat backboard 110 and, as such, a reduction in costs may be achieved.

The exemplary embodiment of the present disclosure provides a configuration in which a plurality of high-voltage battery packs 200 is assembled to the front surface of the seat backboard 110 in a separable state through coupling between the protrusion 310 and the groove 320. Accordingly, it may be possible to separate only failed ones from the plurality of high-voltage battery packs 200, for replacement thereof.

In conventional cases, when a part of batteries breaks or fails, the whole high-voltage battery pack module should be replaced with a new one. For this reason, there is a drawback in that excessive costs are required.

However, the exemplary embodiment of the present disclosure provides a configuration in which only a failed high-voltage battery pack 201 from among a plurality of high-voltage battery packs 200 assembled to the seat backboard 110 is separated from the seat backboard 110 through detachment, and a new high-voltage battery pack 202 is then replaced through assembly thereof to the seat backboard 110 at a position from which the failed high-voltage battery pack 201 has been separated. In accordance with this configuration, there is an advantage in that costs associated with repair may be greatly reduced.

The protrusion 310 may be provided in plural such that plural protrusions 310 may form a particular pattern at one surface of the seat backboard 110, and the groove 320 may be provided in a number of at least two at each high-voltage battery pack 200. Accordingly, each high-voltage battery pack 200 may have an assembly structure in which at least two grooves 320 are coupled to at least two protrusions 310.

As each high-voltage battery pack 200 is assembled to the seat backboard 110 through coupling between at least two protrusions 310 and at least two grooves 320, the high-voltage battery pack 200 may have an advantage in that sufficient coupling force thereof to the seat backboard 110 may be secured.

The seat backboard 110 provided with the protrusion 310 is preferably formed of a plastic composite material in order to secure strength, without being limited thereto.

In accordance with the exemplary embodiment of the present disclosure, the seat backboard 110 may be formed of glass mat-reinforced thermoplastic (GMT).

The GMT has characteristics of excellent lightness, as compared to steel, while maintaining strength equivalent to that of steel.

When the seat backboard 110 is manufactured using the GMT, the seat backboard 110 itself may secure sufficient strength, and may satisfy regulations.

Figure 7:
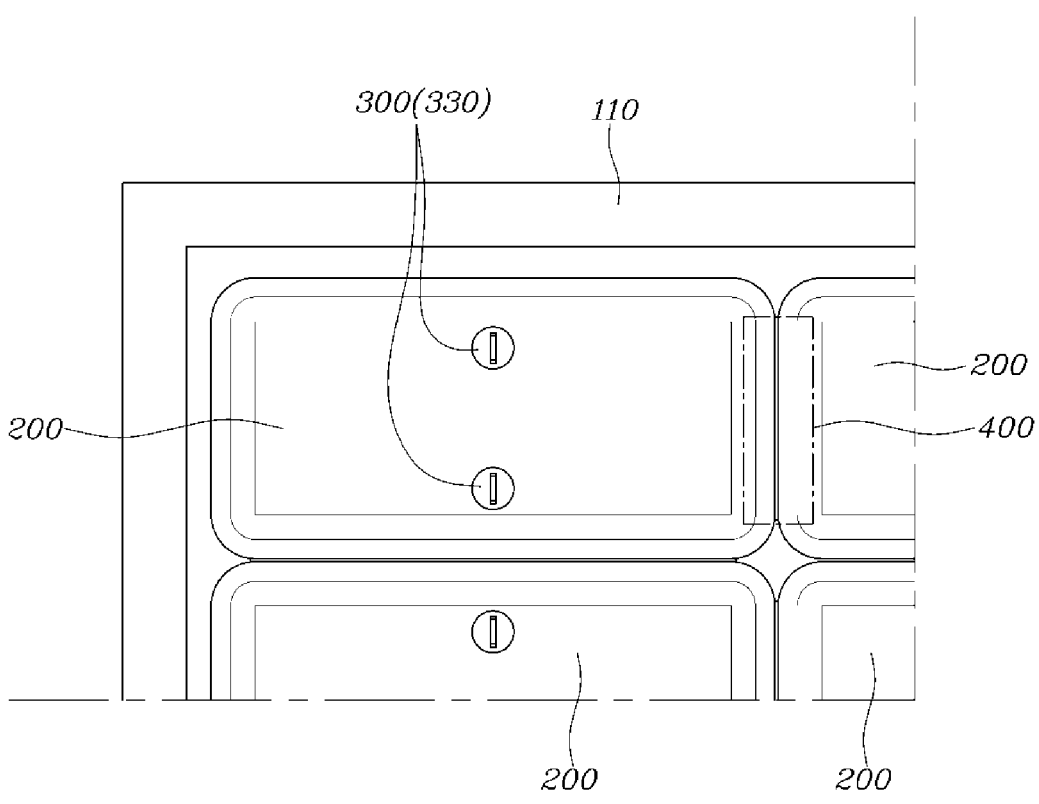
FIG. 7 is a view explaining another embodiment of a first coupler and a second coupler.

Another embodiment of the first coupler 300 is shown in FIG. 7.

That is, the first coupler 300 of FIG. 7 may include a plurality of fastening members 330 threadedly fastened to the seat backboard 110 while extending through the high-voltage battery pack 200.

Each coupling member 330 may include a bolt or a screw. When the high-voltage battery pack 200 is assembled to the seat backboard 110 through two or more fastening members 330, there is an advantage in that a sufficiently higher coupling force than a coupling force obtained by the protrusion 210 and the groove 320 may be secured.

Figure 8:
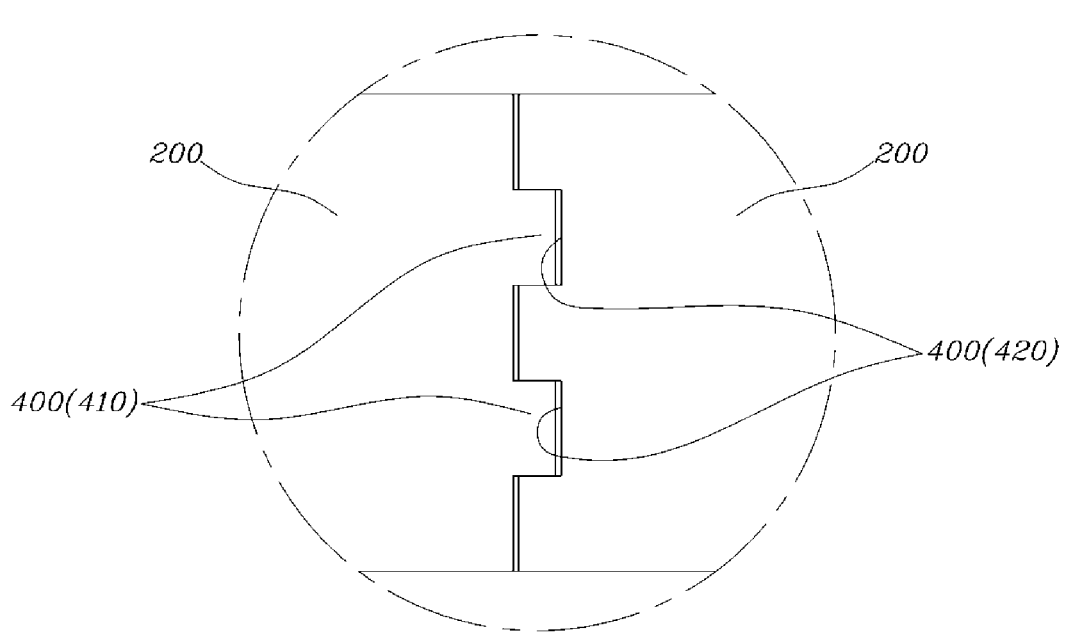
FIG. 8 is a view explaining an embodiment of the second coupler.

In accordance with an embodiment of the present disclosure, as shown in FIGS. 7 and 8, adjacent ones of the high-voltage battery packs 200 assembled to the seat backboard 110 may be assembled to each other in a separable state through a second coupler 400.

The second coupler 400 may function to assemble the adjacent high-voltage battery packs 200 to each other, thereby increasing coupling force between the adjacent high-voltage battery packs 200. Accordingly, the second coupler 400 may function to more stably assemble the high-voltage battery packs 200 to the seat backboard 110.

The second coupler 400 may be disposed at side surfaces of each of the adjacent high-voltage battery packs 200 such that the adjacent high-voltage packs 200 are assembled to each other at the side surfaces thereof facing each other. Alternatively, the second coupler 400 may be disposed at upper and lower surfaces of each of the adjacent high-voltage battery packs 200 such that the adjacent high-voltage packs 200 are assembled to each other at the upper and lower surfaces thereof facing each other.

The second coupler 400 may be constituted by one of an assembly structure of a protrusion 410 and a groove 420, an assembly structure of a hook and a hook groove, and an assembly structure of a bolt or a screw, to assemble the adjacent high-voltage battery packs 200 to each other in a separable state.

As apparent from the above description, the storage system for the vehicle according to the exemplary embodiment of the present disclosure has a configuration capable of storing a plurality of high-voltage battery packs 200 in a separably assembled state in the seat backboard 110 of the vehicle seat. In accordance with the exemplary embodiment of the present disclosure, a space of the seat backboard 100 is additionally secured to store an increased number of high-voltage battery packs 200 in the vehicle. Accordingly, there is an advantage in that an increase in a maximum driving range of the vehicle may be achieved.

In addition, the storage system according to the exemplary embodiment of the present disclosure has a configuration in which a plurality of high-voltage battery packs 200 is separably assembled in the seat backboard 110. Accordingly, it may be possible to achieve swapping of a high-voltage battery pack 200 irrespective of the shape and size of the seat backboard 110. As a result, development investment of the storage system associated with different kinds of vehicles may be minimized and, as such, there is an advantage in that a reduction in costs may be achieved.

Furthermore, the storage system according to the exemplary embodiment of the present disclosure has a configuration in which only a broken or failed high-voltage battery pack 201 from among a plurality of high-voltage battery packs 200 assembled to the seat backboard 110 is separated from the seat backboard 110, and a new high-voltage battery pack 202 is then replaced through assembly thereof to the seat backboard 110 at a position from which the failed high-voltage battery pack 201 has been separated. In accordance with this configuration, there is an advantage in that costs associated with replacement or repair may be reduced.

In addition, the storage system according to the exemplary embodiment of the present disclosure may contribute to eco-friendly management through an increase in possibility of battery recycling.

Furthermore, the storage system according to the exemplary embodiment of the present disclosure has an advantage in that it may be possible to achieve additional increases in strength and stiffness of the seat 100 by the plurality of high-voltage battery packs 200 assembled in the seat backboard 110.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A storage system for a vehicle, the storage system comprising:
   a storage device provided in a vehicle seat; and
   a battery pack assembled in the storage device in a separable state;
   wherein the storage device comprises a seat back board provided in the vehicle seat;
   wherein the seat backboard and the battery pack are assembled in the separable state through a first coupler; and
   wherein the first coupler comprises:
      a protrusion provided in one surface of the seat backboard, the protrusion configured to protrude from the surface of the seat backboard; and
      a groove provided in one surface of the battery pack and configured to receive the protrusion, for assembly therebetween.

2. The storage system according to claim 1, wherein, when viewed in an upright state of the seat backboard, the protrusion is formed in a front surface of the seat backboard, and a back surface of the seat backboard takes a form of a flat surface.

3. The storage system according to claim 1, wherein:
   the protrusion comprises plural protrusions; and
   the battery pack comprises plural high-voltage battery packs.

4. The storage system according to claim 3, wherein:
   the plural protrusions form a particular pattern at the one surface of the seat backboard; and
   the plural high-voltage battery packs are assembled to the seat backboard.

5. The storage system according to claim 3, wherein a failed one of the plural high-voltage battery packs is configured to be separated from the seat backboard.

6. The storage system according to claim 5, wherein only the failed one of the plural high-voltage battery packs is configured to be replaced.

7. The storage system according to claim 5, wherein:
   the protrusion comprises plural protrusions that form a particular pattern at the one surface of the seat backboard;
   the groove comprises at least two grooves formed at each of the plural high-voltage battery packs; and
   the plural high-voltage battery packs are assembled to the seat backboard through coupling of the at least two grooves to at least two of the plural protrusions.

8. The storage system according to claim 1, wherein the seat backboard provided with the protrusion is formed of a plastic composite material.

9. The storage system according to claim 1, wherein:
   the battery pack comprises plural high-voltage battery packs assembled to the seat backboard; and
   adjacent ones of the plural high-voltage battery packs are assembled to each other in a separable state through a second coupler.

10. The storage system according to claim 9, wherein the second coupler is one of an assembly structure of a protrusion and a groove, an assembly structure of a hook and a hook groove, or an assembly structure of a bolt or a screw.

11. A vehicle comprising the storage system of claim 1.

12. A storage system for a vehicle, the storage system comprising:
   a storage device comprising a seat backboard provided in a vehicle seat;
   a battery pack assembled in the storage device in a separable state; and
   a first coupler configured to assemble the seat backboard and the battery pack in a separable state;
   wherein the first coupler comprises a protrusion provided in one surface of the seat backboard;
   wherein the protrusion comprises plural protrusions; and
   wherein the battery pack comprises plural high-voltage battery packs.

13. The storage system according to claim 12, wherein:
   the plural protrusions form a particular pattern at the one surface of the seat backboard; and
   the plural high-voltage battery packs are assembled to the seat backboard.

14. The storage system according to claim 12, wherein a failed one of the plural high-voltage battery packs is configured to be separated from the seat backboard.

15. The storage system according to claim 14, wherein only the failed one of the plural high-voltage battery packs is configured to be replaced.

16. A vehicle comprising the storage system of claim 12.

17. A storage system for a vehicle, the storage system comprising:
   a storage device provided in a vehicle seat; and
   a battery pack assembled in the storage device in a separable state;
   wherein the storage device comprises a seat backboard provided in the vehicle seat;
   wherein the seat backboard and the battery pack are assembled in the separable state through a first coupler; and
   wherein the first coupler comprises a plurality of fastening members threadedly fastened to the seat backboard while extending through the battery pack.

* * * * *